(12) United States Patent
Angeles

(10) Patent No.: US 9,600,592 B2
(45) Date of Patent: Mar. 21, 2017

(54) SYSTEMS, APPARATUS, AND PROCESSES FOR USING SMART LEARNING TOOLS WITH TOUCHSCREEN DEVICES

(71) Applicant: We The Smart Finger Puppet, Santa Barbara (CA)

(72) Inventor: Joel Puno Angeles, North Hills, CA (US)

(73) Assignee: We The Smart Finger Puppet, Santa Barbara, CA (US)

( * ) Notice: Subject to any disclaimer, the term of this patent is extended or adjusted under 35 U.S.C. 154(b) by 31 days.

(21) Appl. No.: 14/937,711

(22) Filed: Nov. 10, 2015

(65) Prior Publication Data

US 2016/0133141 A1    May 12, 2016

Related U.S. Application Data

(60) Provisional application No. 62/078,546, filed on Nov. 12, 2014.

(51) Int. Cl.

| | |
|---|---|
| *A63F 13/25* | (2014.01) |
| *G06F 17/30* | (2006.01) |
| *A63F 13/24* | (2014.01) |
| *A63F 13/65* | (2014.01) |
| *A63F 13/335* | (2014.01) |
| *A63F 13/352* | (2014.01) |
| *G09B 7/00* | (2006.01) |
| *A63F 5/04* | (2006.01) |

(52) U.S. Cl.
CPC ........ *G06F 17/30887* (2013.01); *A63F 13/24* (2014.09); *A63F 13/335* (2014.09); *A63F 13/352* (2014.09); *A63F 13/65* (2014.09); *G09B 7/00* (2013.01); *A63F 5/045* (2013.01); *A63F 13/25* (2014.09)

(58) Field of Classification Search
CPC ...... G09B 5/02; A63F 13/25; G06F 17/30887
USPC ........................................................ 434/362
See application file for complete search history.

(56) References Cited

U.S. PATENT DOCUMENTS

| | | |
|---|---|---|
| 6,168,520 B1 | 1/2001 | Baerlocher et al. |
| 8,803,844 B1 | 8/2014 | Green et al. |
| 8,827,160 B1 | 9/2014 | Pascal et al. |

(Continued)

OTHER PUBLICATIONS

Indiegogo: Smart Finger Puppet, Web Archive, available to public on Oct. 27, 2013, < https://web.archive.org/web/20131027174014/ http://www.indiegogo.com/projects/smart-finger-puppet >.*

(Continued)

*Primary Examiner* — Robert J Utama
*Assistant Examiner* — Thomas Hong
(74) *Attorney, Agent, or Firm* — Sheppard, Mullin, Richter & Hampton LLP

(57) ABSTRACT

Systems, methods, and non-transitory computer-readable media can receive a first user-provided topic among a plurality of user-provided topics. Topic-based information related to the first user-provided topic is received. The first user-provided topic is assigned to a first game wheel segment among a plurality of game wheel segments. The plurality of game wheel segments define a game wheel. The first user-provided topic is selected based on a spinning of the game wheel. A problem based on the topic-based information is presented.

16 Claims, 10 Drawing Sheets

(56) References Cited

U.S. PATENT DOCUMENTS

| | | |
|---|---|---|
| 2009/0108057 A1 | 4/2009 | Mu et al. |
| 2010/0160023 A1* | 6/2010 | Kane .................. G06Q 20/3433 463/17 |
| 2012/0329555 A1 | 12/2012 | Jabara et al. |
| 2014/0009427 A1 | 1/2014 | Kang |

OTHER PUBLICATIONS

Smart Wheel of Wisdom, Web Archive, available to public on Oct. 2013 < https://web.archive.org/web/20131002085424/http://smartwheelofwisdom.com/>.*

YouTube: theUltimateABC's app, published on Oct. 1, 2013 <https://www.youtube.com/watch?v=GPUQkUI_hqo>.*

International Search Report and Written Opinion for corresponding International Application No. PCT/US2015/60024, dated Jan. 21, 2016.

\* cited by examiner

FIGURE 2

SYSTEMS, APPARATUS, AND PROCESSES FOR USING SMART LEARNING TOOLS WITH TOUCHSCREEN DEVICES

CROSS-REFERENCE TO RELATED APPLICATIONS

The present application claims priority to U.S. Provisional Application No. 62/078,546, filed on Nov. 12, 2014, the entire contents of which are incorporated by reference as if fully set forth herein.

TECHNICAL FIELD

The present disclosure relates generally to learning tools, and more particularly to smart learning tools that may be used with touchscreen devices.

BACKGROUND OF THE INVENTION

With the growing prevalence of touchscreen technology, a growing number of schools are now allowing classrooms to use hand-held touchscreen devices as learning tools among children and adults. This technology presents new opportunities to engage students in interactive ways that will assist in their learning and get students excited about education.

SUMMARY OF THE INVENTION

Various embodiments of the present disclosure can include systems, methods, and non-transitory computer readable media configured to receive a first user-provided topic among a plurality of user-provided topics. Topic-based information related to the first user-provided topic is received. The first user-provided topic is assigned to a first game wheel segment among a plurality of game wheel segments. The plurality of game wheel segments define a game wheel. The first user-provided topic is selected based on a spinning of the game wheel. A problem based on the topic-based information is presented.

In an embodiment, receiving topic-based information related to the first user-provided topic comprises receiving a file address.

In an embodiment, the file address is a URL.

In an embodiment, presenting a problem based on the topic-based information comprises presenting a first piece of information that was obtained from the URL; and presenting a second piece of information that was not obtained from the URL.

In an embodiment, a first player is associated with a first character.

In an embodiment, associating the first player with the first character comprises reading a QR code associated with the first character.

In an embodiment, associated the first player with the first character comprises associating the first player with a first conductive finger puppet.

In an embodiment, the first conductive finger puppet is configured to provide biometric feedback relating to the first player.

In an embodiment, the game wheel comprises a replaceable overlay.

In an embodiment, a selection of a game mode from a plurality of game modes is receives, the plurality of game modes including a learning mode and a trivia mode.

These and other features and advantages of the invention should become more readily apparent from the detailed description of the preferred embodiments set forth below taken in conjunction with the accompanying drawings, which illustrate, by way of example, the principles of the disclosure.

BRIEF DESCRIPTION OF THE DRAWINGS

FIG. 2 illustrates an example information input interface, according to an embodiment of the present disclosure.

The drawings are provided for purposes of illustration only and merely depict typical or example implementations. These drawings are provided to facilitate the reader's understanding and shall not be considered limiting of the breadth, scope, or applicability of the disclosure. One skilled in the art will readily recognize from the following discussion that alternative embodiments of the structures and methods illustrated in the figures can be employed without departing from the principles of the disclosed technology described herein. For clarity and ease of illustration, these drawings are not necessarily drawn to scale.

DETAILED DESCRIPTION

Improvements in technology have yielded new tools and resources that may be used to increase the effectiveness with which students are taught. These improvements include the use of touch-screen devices in classrooms, and new software and hardware that may be used in conjunction with these devices.

However, it continues to be a challenge for educators to utilize the available technology in a way that is engaging and effective for students. Therefore, an improved approach can be beneficial for alleviating various concerns associated with conventional approaches or improving conventional approaches. Based on computer technology, the disclosed technology can provide a customizable and engaging learning game in which players can play by themselves or compete against others to learn various topics of interest.

Figure 1:
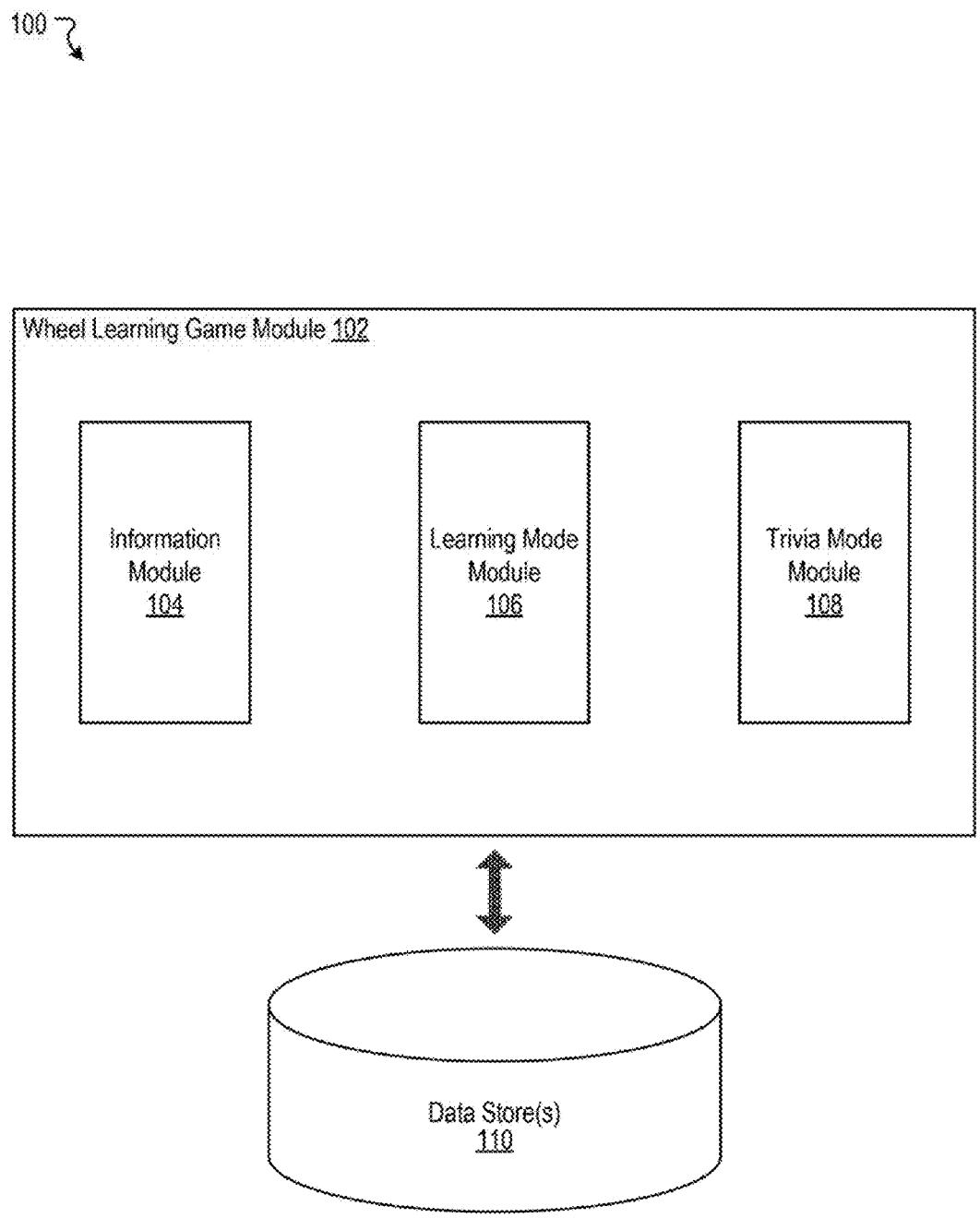
FIG. 1 illustrates an example system including an example wheel learning game module, according to an embodiment of the present disclosure.

FIG. 1 illustrates an example system 100 including an example wheel learning game module 102 configured to facilitate an educational game on a touch-screen device, according to an embodiment of the present disclosure. The wheel learning game module 102 can be configured to receive a plurality of topics, each topic having a set of information that the player wishes to learn, and assisting the player to learn the desired information by executing a wheel-based learning game using the provided information. The topics and information that the player wishes to learn may be any topic or any information, including, for example, various topics in math, history, science, language, computer sciences and engineering, arts, etc.

As shown in the example of FIG. 1, the wheel learning game module 102 can include an information module 104, a learning mode module 106, and a trivia mode module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

The wheel learning game module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the wheel learning game module 102 can be implemented, in part or in whole, as software running on one or more computing devices or systems, such as on a server computing system or a user (or client) computing system. For example, the wheel learning game module 102 or at least a portion thereof can be implemented as or within an application (e.g., app), a program, or an applet, etc., running on a user computing device or a client computing system, such as the user device 710 of FIG. 7. In another example, the wheel learning game module 102 or at least a portion thereof can be implemented using one or more computing devices or systems that include one or more servers, such as network servers or cloud servers. It should be understood that there can be many variations or other possibilities.

The information module 104 can be configured to receive, store, and/or load information relating to various topics that may be used in a learning game. In certain embodiments, a learning game may be used to help users learn information relating to various topics. A user may be asked to input various topics or information that the user wishes to learn, which the information module 104 may then receive and store so that it can be used in the learning game. Aspects of the information module 104 are discussed in greater detail herein.

The learning mode module 106 can be configured to carry out a "learning mode" in a learning game. The learning mode may take the information obtained via the information module 104 and present it to the user so that the user can study and learn the information. This may include taking a set of information and presenting it on a touch-screen device for a user to study. Aspects of the learning mode module 106 are discussed in greater detail herein.

The trivia mode module 108 can be configured to carry out a "trivia mode" in a learning game, in which various pieces of information and/or questions are presented to a user for the user to select a correct answer and earn points. The information may preferably be related to the information that was obtained by the information module 104 and presented to a user by the learning mode module 106. As such, the trivia mode carried out by the trivia mode module 108 can test the user to ensure that they have adequately and properly learned the material that the user wishes to learn. In certain embodiments, the information module 104 receives information that a user wishes to learn, the learning mode module 106 presents the information to the user so that the user can study and learn the information, and the trivia mode module 108 carries out a trivia game to test the user's learning and understanding of the material. Aspects of the trivia mode module 108 are discussed in greater detail herein.

Furthermore, in some embodiments, the wheel learning game module 102 can be configured to communicate and/or operate with the at least one data store 110, as shown in the example system 100. The data store 110 can be configured to store and maintain various types of data. In some implementations, the data store 110 can store information associated with a learning game. The information associated with the learning game can include data about users and players, various educational topics and associated information that users may wish to study and learn, information for implementing various features and carrying out the rules of the learning game, and various other types of data. In some embodiments, the data store 110 can store information that is utilized by the wheel learning game module 102. For instance, the data store 110 can store education topics and information inputted by the user (e.g., information that the user has indicated that he or she wishes to study and learn), user information (e.g., login information, password information, contact information, etc.), player information (player scores, player topics), game states, game rules, game interfaces, and any other information that may be used to carry out the present technology disclosed herein. It is contemplated that there can be many variations or other possibilities.

Figure 2:
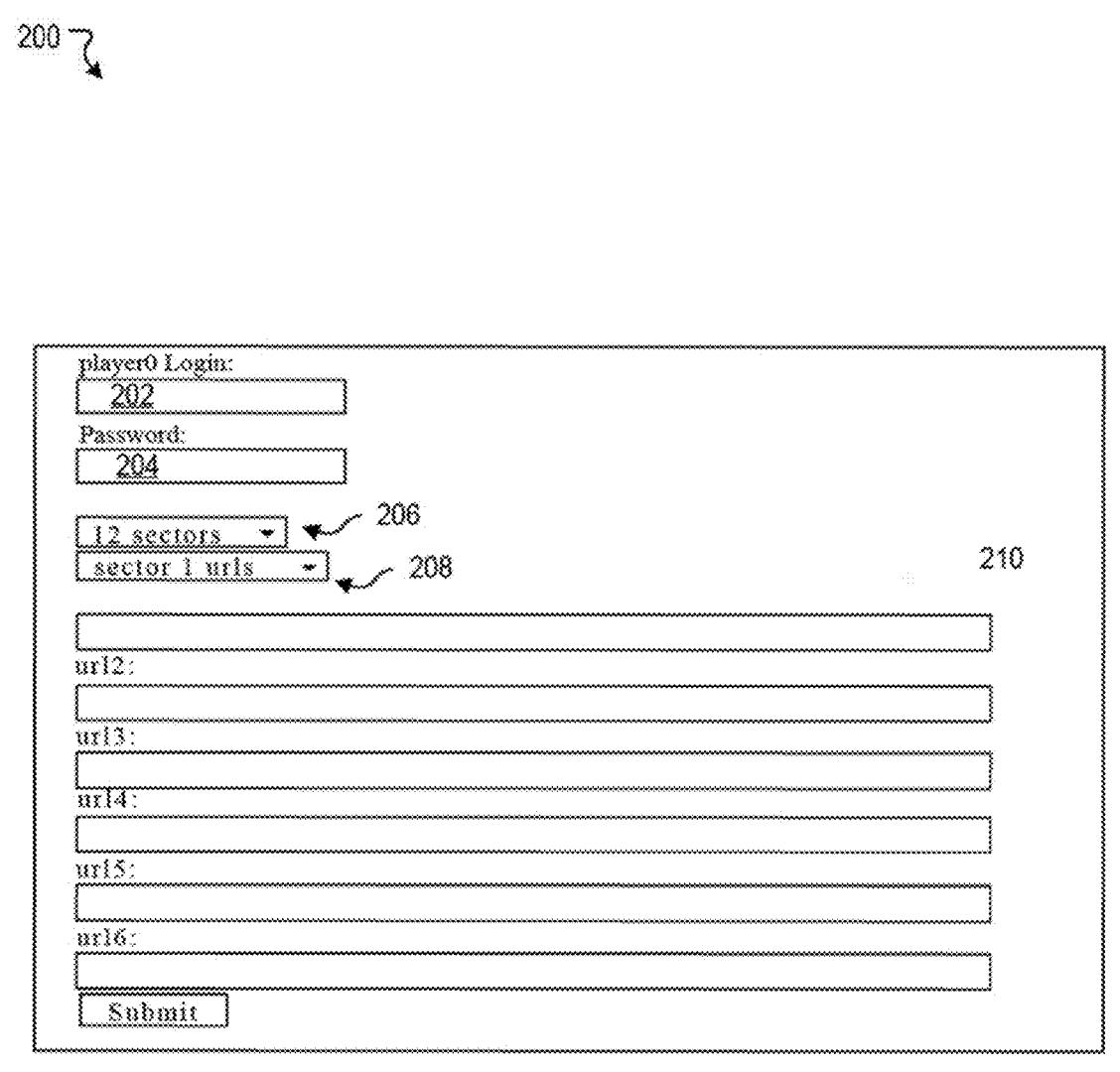

FIG. 2 illustrates a sample information input page 200. In certain embodiments, the information input page 200 may assist in carrying out certain aspects and functions of the information module 104 of FIG. 1. In the sample information input page 200, a user is prompted to enter a login (e.g., a username) at box 202 and a password at box 204. The login information may be used by a learning game to store user credentials and information associated with the user. For example, the user's personal information, contact information, game-related information, and the like can be stored and associated with the user so that this information does not have to be reset and/or entered by the user each time the user wishes to play the learning game.

The user is also prompted to enter additional game-related information to set up the learning game. In the example shown in FIG. 2, this additional game-related information includes defining the number of sectors for the game (drop-down menu 206), and defining one or more URLs for each sector (drop down menu 208 and input boxes 210).

In certain embodiments, the learning game is a wheel-based learning game, in which each sector on a wheel is assigned to a particular topic. Within certain aspects of the game, the wheel is spun, and based on the spinning of the wheel, a single sector is selected, and a question and/or problem associated with that sector's topic is presented to the user. In FIG. 2, the drop-down menu 206 allows the user to select how many sectors should be used for the wheel-based learning game, and the user has selected 12 sectors.

As discussed above, each sector on the wheel can be assigned a particular topic. When the wheel is spun and lands on a particular sector, questions and/or problems relating to that sector's assigned topic are presented to the user. Using drop-down menu 208 and the input boxes 210, a user can assign a topic to each wheel sector and provide the information that provides the basis for the questions and problems presented in the wheel-based learning game for that sector/topic. For example, in FIG. 2, the user has selected "sector 1" in the drop-down menu 208. The information boxes 210 below the drop-down menu 208 ask for six different "URLs." In this example, a user can input up to six different web URL's to be associated with sector 1. Each of the web URL's entered by the user may contain information that can be used by the wheel-based learning game to create questions or problems when the wheel lands on sector 1. The learning game may be configured to locate the URLs specified by the user and to pull information from the URL to be incorporated into the learning game. For example, the learning game may download text, images, videos, and other data stored at the provided URL. The learning game can be configured to "defragment" data at the provided URLs, i.e., break down the information into smaller components which may then be incorporated into the learning game.

By having the user provide the information for the learning game, each user can customize the contents of the game to fit their own needs, rather than forcing the user to use pre-determined information sets provided by the game-maker or other producers. In other embodiments, a user may be given the option to input not only URLs, but also other addresses, files, or any other identifier identifying information that the user wishes to be included in the learning game.

Once the user has finished inputting the URLs for sector 1, the user can select drop-down menu 208, select sector 2, and input URLs for sector 2, and so on until the user has input all of the relevant information for all twelve sectors. If there are multiple players, each player can go through the process of inputting sector topics and information, as described above. The inputted information may be stored and associated with each individual user so that the user need not re-enter the information each time, and may be given the option to load previously entered topics and/or URLs in the future.

In certain embodiments, each sector in the wheel-based learning game can be associated with one or more applications, for example, by entering an application identifier (e.g., a URL for the application or an application file address) into the information boxes 210. For example, if the wheel lands on a sector that has been associated with an application, the application could be opened and played by the user. In a more particular embodiment, the user's playing of the application could be recorded, and stored in the sector. The recording could then be used as part of the trivia mode of the learning game. Recording time can be predetermined or automatically set. The recording can be defragmented, and the defragmented components could be used during the trivia mode. In this way, videos, music, apps, websites, pictures, and anything that can be accessed by a URL could be stored in any of the sectors of the game wheel. Any of the game wheel sectors can have the ability to record video, music, pictures, etc., that can then be stored in that particular sector. The stored information can be defragmented by the wheel app game, and the user's memory of the recordings can then be tested in the trivia mode to see if he or she remembers what information was stored in their particular sector.

Figure 3A:
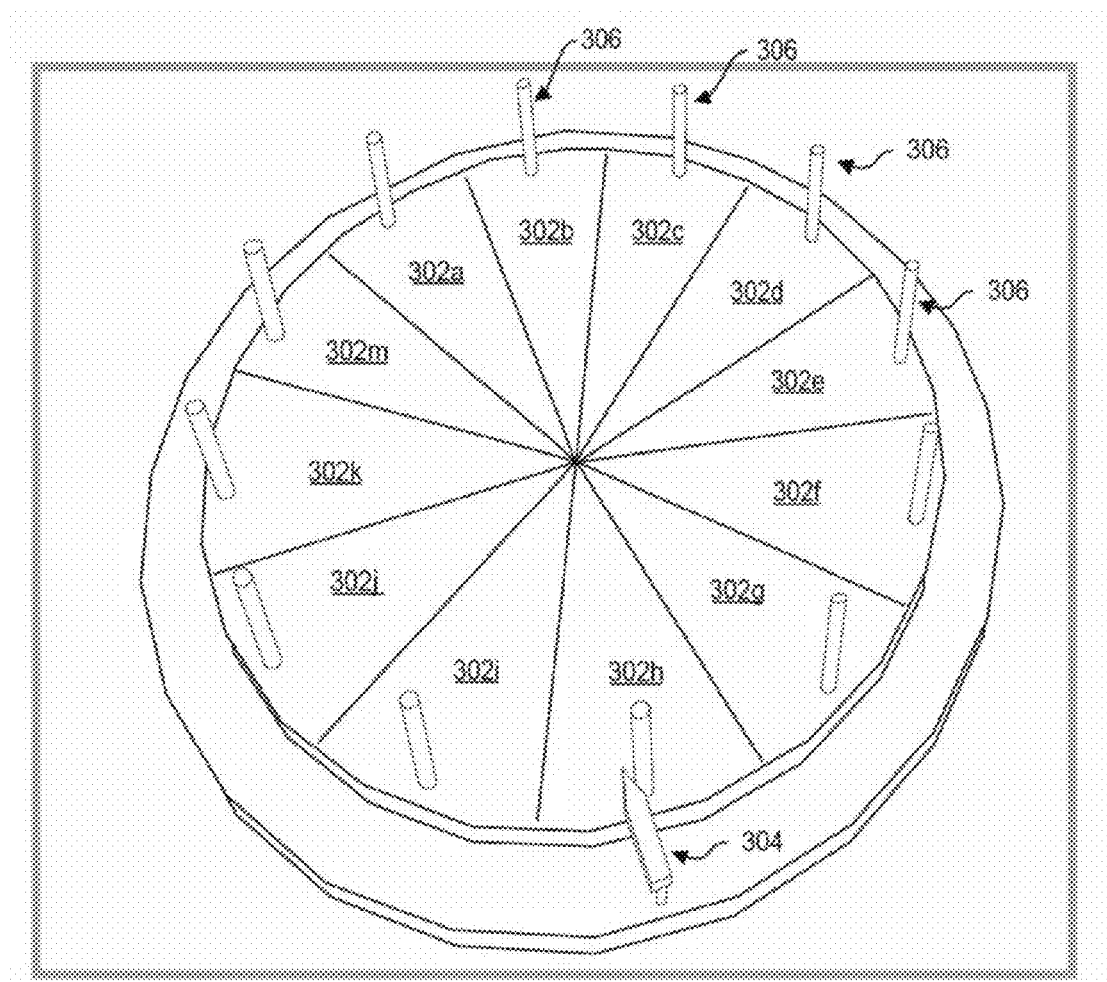
FIG. 3A illustrates an example game wheel, according to an embodiment of the present disclosure.

FIG. 3A illustrates an example wheel 300 that may be used in conjunction with the wheel-based learning game disclosed herein. The wheel 300 is divided in 12 sectors 302a-m. As discussed above with reference to FIG. 2, each sector may be associated with a particular topic. An arrow 304 points to one sector at any given time. As the user spins the wheel, the sectors 302a-m spin around until the wheel 300 stops, and the arrow 304 lands on a particular sector. In certain aspects of the wheel-based learning game, a question and/or problem based on the topic associated with that particular sector may then be presented to the user on a user device, such as a touch-screen device. The wheel 300 may be configured to communicate with the user device so that the touch-screen device can be provided with information as to which sector the arrow 304 is currently pointing to, so that the touch-screen device can present a question/problem on the correct topic. In certain embodiments, the wheel 300 and the user device may communicate such that physical spinning of the wheel 300 will result in digital display of a spinning wheel on the user device corresponding to spinning of the physical wheel 300. In certain embodiments, the wheel 300 may include digital display elements such that the wheel 300 can receive topic information corresponding to each sector 302, and display a word or phrase on each sector corresponding to that sector's associated topic (e.g., if sector 302a's topic is Algebra, then sector 302a can display "Algebra").

Figure 3B:
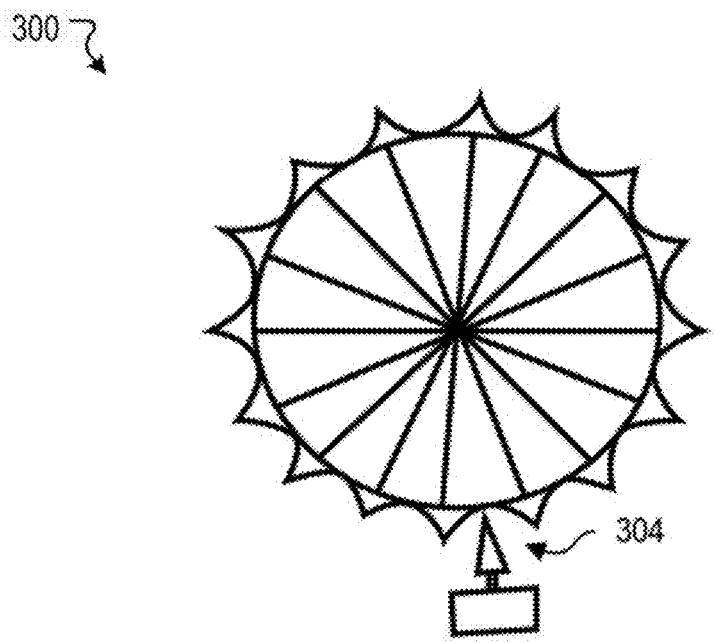
FIGS. 3B and 3C illustrate alternative embodiments of example game wheels, according to embodiments of the present disclosure.
Figure 3C:
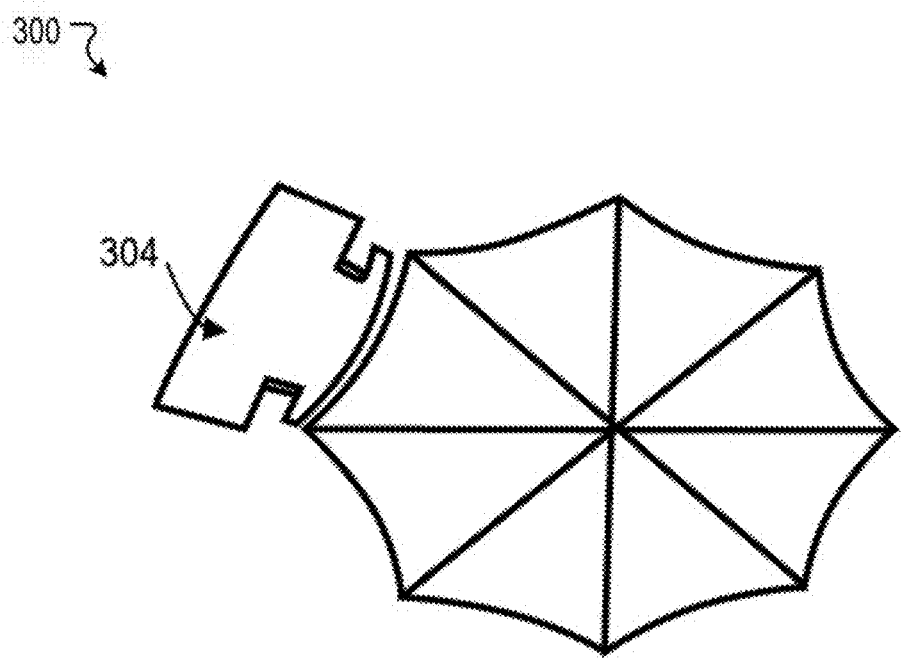

In various embodiments, the wheel 300 may be a physical wheel, as shown in FIG. 3, or may be an electronic/digital wheel presented on a user device. "Spinning" of the digital wheel may be performed using a randomization algorithm or other spinning algorithm to cause the digital wheel to spin and randomly or semi-randomly select a sector.

In certain embodiments, the wheel 300 may include a replaceable front design or overlay printed on paper, plastic, wood, glass, fiber, textile, ceramic, rubber, composite, metal, or any suitable material, which can be placed to cover the top of the wheel 300. The replaceable front overlay may include lines to demarcate the different sectors, and may include text or visuals to indicate the topic associated with each sector. The overlay can also be printed with electronic circuitry using conductive ink that can interact with various components, such as, for example, circuit stickers and electronic modules such as adapters, switches, LEDs, potentiometer, transistors, sensors, blinkers, buzzers, switches, connectors, motors, and logic gates. The replaceable front overlay can have a steel backing that allows modules to snap onto the replaceable front overlay. Electronic displays can also be integrated into the wheel 300 that can communicate with website servers, electronic devices, or any combination thereof. The replaceable front overlay can be modified or designed for any suitable purpose including, without limitation, reading, mathematics, science, any curriculum, product, services, or subject. It can also include bar codes, QR codes, fiducial markers (such as those developed by reacTIVision), Touchcodes, RFID, NFC tags, and any combination thereof.

Although an example of the game wheel 300 has been discussed, it should be understood that it can be manufactured in any suitable or desirable shape known in the art. The wheel 300 can consist of one or more parts or pieces integrated together. It can also include integrated electronics. For example, it may include components that can communicate via wifi, Bluetooth, infrared, NFC, optical communication, all possible frequencies of electromagnetic radiation, and any combination thereof with website servers, touchscreen devices, optical or holographic devices, laptops, computers, video or music devices, and any combination of these devices. One embodiment includes a base that may be fixed and has an arrow-shaped marker that can be spring loaded or placed inside a piece of wood. The arrow-shaped marker can be a preferred embodiment that can be removable and replaceable, but various modifications can be made without departing from the scope of the invention. Two alternative embodiments of the wheel 300 are demonstrated in FIGS. 3B and 3C.

The arrow 304 can be integrated with electronics that allow it to interact with other components and devices, such as one or more finger puppets, one or more removable pegs, and replaceable overlays.

The wheel 300 can include one or more upstanding pegs 306. In certain embodiments, these pegs 306 may be removable. Each peg 306 stand can be used to display, hold, and store a finger puppet, as discussed in greater detail herein. The pegs 306 can be designed in any desirable manner known in the art. They can be divided into one or more pieces or slices that correspond to a particular subject matter.

The pegs 306 may be attached to a base of any shape, including, without limitation, trains, accessory cars, tracks, bridges, buildings, engines, cabooses, fire trucks, school buses, tow trucks, tugboat vehicle cars and animal cars such as dog, cat, duck, bear, cow, giraffe, zebra, and any suitable or desirable shape known in the art. The pegs 306 may also be integrated with electronics to interact with other devices and components, such as, for example, the wheel 300, the arrow 304, or one or more finger puppets. The pegs 306 can also include barcodes, QR codes, fiducial markers, Touchcodes, RFID, NFC tags, or any combination thereof. Table-based tangible user interfaces (TUI) and multi-touch interactive surfaces such as a tangible modular synthesizer can also be integrated on the Wheel App game or the physical wheel.

Figure 4:
FIG. 4 illustrates an example player card, according to an embodiment of the present disclosure.

FIG. 4 illustrates an example character card 400 that may be used in conjunction with a wheel-based learning game, in accordance with an embodiment of the present disclosure. FIG. 4 shows a front side 402 of the card 400, that shows a particular character. Players may choose from various characters to act as avatars within the learning game. For example, there may be a dog character, a cat character (shown in FIG. 4), an elephant character, and a parrot character. Each player in the game can choose one character to represent him- or herself. The back side 404 of the character card 400 may include a QR code or other code that can be input into the user device on which the learning game is being played to associate each player with their character. For example, the learning game presented on the user device may ask for player 1 to identify a character to be associated with. The player may scan the QR code 404 (or another code on the character card 400). In another embodiment, each character may also be associated with a finger puppet. Players could identify a character to be associated with by scanning a code on the finger puppet, or by placing the finger puppet in front of a camera on a user device for image recognition, or via communications via the finger puppet and the user device (e.g., Bluetooth or NFC communications). This may be done for each player. Other methods may be used to associate each player with a particular character. For example, there may be a drop-down menu presented in the game such that each player can simply select a character within the game to act as an avatar.

As mentioned above, each character may also have an associated finger puppet that may be used by each player to play the learning game on a touch-screen device. For example, if player 1 has chosen the cat character shown in FIG. 4, there may be a cat finger puppet that player 1 may put on their finger to use in the game. The finger puppet may be conductive, or have a conductive portion that creates a closed circuit to transfer electrical charge, such that a touch-screen device will be responsive to contact by the finger puppet. The finger puppets can be made of any suitable material. Suitable materials may include textile, fabric, polyester or wool, wool felt, material that can either hand knitted, crocheted, felted, sewn in, woven, 3D printed, machined or any combination thereof. Other materials can include, without limitation, wood, metal, plastic, glass, ceramic, rubber, composite, textile or any combination thereof. The bulk, interior and exterior surface or entire composition of the tip, sections of the body, or the whole body of the finger puppets can made of conductive yarn or any suitable conductive materials. Suitable conductive materials may include conductive polyester, conductive wool, conductive wool felt, black carbon, grapheme, graphite, carbon nanotube fibers, nanowires, nanomaterials, semiconductors, metals, conductive paper, conductive rubber, conductive plastic, conductive fabric, conductive wood, conductive glass, conductive ceramic, metamaterials, and any combination thereof. In certain embodiments, the finger puppet can be configured to carry sufficient conductivity on the conductive material such that electricity can flow from a person's finger or hand to the touchscreen device. Finger puppets can also be made of smart materials that change color, form, or shape in response to an external or internal stimuli, such as stress, temperature, air composition, moisture, pH, electric and/or magnetic fields.

The material used to create a finger puppet can be hand knitted, crocheted, felted, sewn, woven, printed using 3D printers, machined into the fabric, fabricated, or manufactured in any suitable or desirable way known in the art. In certain embodiments, the finger puppets can include a sliding knot/cord made of any suitable material, including hemp, yarn, leather, fiber, rubber, textile, composites, and combinations thereof, that can secure or tighten the finger puppet onto a finger. In another embodiment, fingers puppets can also include a bracelet that can secure or tighten the finger puppet on the arm. The finger puppets can have a locking mechanism known in the art. They may also be embellished or designed with a non-removable or removable printed material, clothes or accessories, key chains, magnets, hooks, pockets, or the like. In certain embodiments, the finger puppet can also function or be made into a wearable device, such as a watch or wristband that can continuously monitor health and physical activities. The finger puppet can also be placed anywhere on the body and be used for health monitoring.

In certain embodiments, the materials used to make the finger puppets can also be made into a battery using materials such as carbon nanotube fibers, nanowires, nanomaterials, semiconductors, metals, paper, plastic, ceramic, and any combination thereof. The finger puppets can be integrated with electronic devices such as circuit stickers, electronic modules, light emitting diodes, computer, sensors, displays, detectors, laser, camera, semiconductor devices, nanotechnology, or any combination thereof. The finger puppets may be configured to interact with other components and devices, such as the replaceable overlay or the wheel 300, the pegs 306, or the arrow 304.

Various aspects of a wheel-based learning game will now be described in greater detail in accordance with an embodiment of the present disclosure. As discussed above, the wheel-based learning game may be played on a user device, such as a computer, tablet, smart-phone, mobile device, or other computing device. The user device may have a touch-screen, or an alternative user interface for users to view questions and select answers (e.g., a traditional keyboard, mouse, and computer display arrangement). In certain embodiments, use of a mobile device connected to a wide area network such as the Internet may allow for access to an endless selection of content and entertainment remotely. Providing content such as URLs, videos, any media from the user device to a display (such as a TV) while allowing the user device to keep functioning on its own breaks the boundaries of the traditional screen. The learning game disclosed herein can be delivered remotely at any location and allow game players access to a customized gamepad controller that fits the player's and game's needs when the game is beamed to a display. The disclosed game can be played remotely anywhere so long as players are connected to the internet. In certain embodiments, other devices may also be integrated into the wheel-based learning game, such as holograms, infrared sensors, infrared cameras, acoustic, ultrasound, and other electromagnetic waves that can turn any flat screen TV, monitor, or surface into an interactive screen or touchscreen. Such interactive screens and surface can display the learning game and also interact with users and the smart learning tools disclosed herein.

The wheel-based learning game may begin by requesting players to input various information and topics that the players wish to study, learn about, and be tested on. In the example shown in FIG. 2, players were ask to input various information links, such as URLs or file addresses, each information link containing information on one or more topics. For ease of explanation, URLs will be used to explain the example embodiment. The wheel-based learning game can then access and pull information from each URL provided (e.g., pulling text, videos, images, and other data). According to the information provided by the player, each sector in the game is assigned a particular topic, and information associated with that topic is stored and associated with that sector. Each player may define a different topic for every sector, such that when it is a first player's turn, each sector will be assigned with a topic according to a first set of topics, and when it is a second player's turn, each sector may be assigned with a topic according to a second set of topics that differs from the first set of topics. The information pulled from the various URLs may then be used to teach and educate the player on each of the various topics, and then later test the player on the various topics using the material contained within the provided URLs.

Each player may choose a character to act as an avatar for the player within the wheel-based learning game. Each character may have a character card (FIG. 4) and/or a conductive finger puppet associated with the character. Users can then provide input to the wheel-based learning game specifying the character to be associated with each player. This may be done, for example, using a drop-down menu within the game, or using a QR code on the back of the character card, or a QR code or other identifying-device (e.g., NFC tag, Bluetooth, etc.) on the conductive finger puppet.

The wheel-based learning game may have two different modes: a learning mode and a trivia mode. In the learning mode, users may be presented with the base information contained within the provided URLs so that users can study and learn the information. In one embodiment of the learning mode, players may take turns spinning a wheel (e.g., FIG. 3A). As the wheel spins and lands on a sector, each sector being associated with a topic and information, the information associated with that sector may then be presented to the user for the user to view and study. For example, if the sector is associated with an educational video, and the wheel lands on that sector, the video may be played for the user. As noted above, each sector may be assigned a different topic and different information for each player (i.e., sector 302a of FIG. 3 may be an "Algebra" sector for Player 1, and may be a "Revolutionary War" sector for Player 2.) Each player can take turns spinning the wheel and learning about each of the different sectors/topics on their particular wheel (this may be a single physical wheel, but it is unique set up for each player). The wheel may be programmed so that in the learning mode, it keeps track of which sectors have already been presented for each player so as not to present each sector more than once. Alternatively, the wheel may be completely random, such that sectors may be repeated multiple times. Players may have the option of repeating information presentations (if they feel they need to view it again), or may have the option of skipping sector information presentations that they have already seen previously. Alternatively, in the learning mode, players may not be asked to spin the wheel, and may simply go through each topic/sector and the associated information in whatever way they feel will best assist in their learning.

Figure 5A:
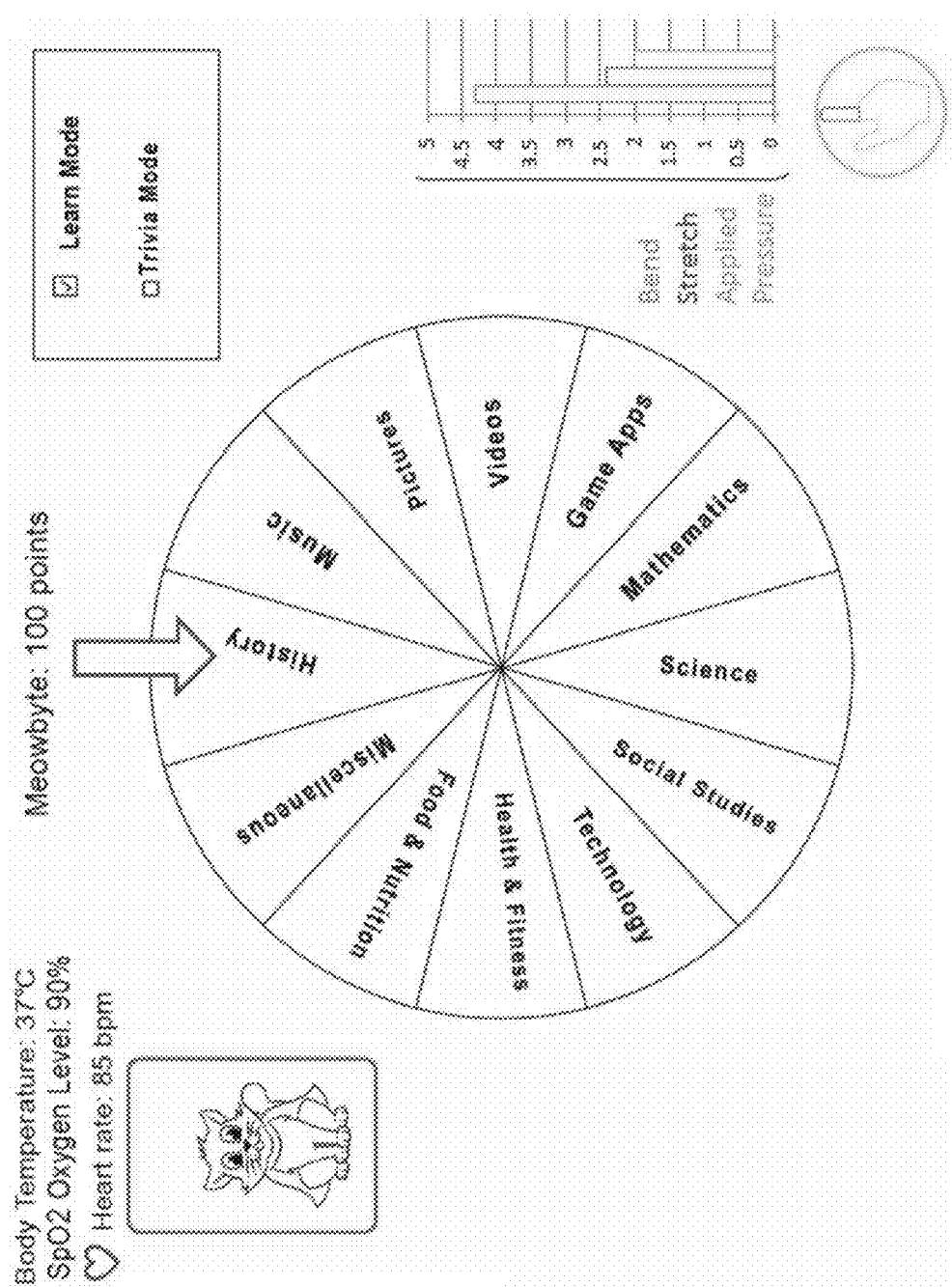
FIG. 5A illustrates an example wheel-based learning game interface, including biometric feedback, according to an embodiment of the present disclosure.

In certain embodiments, the wheel-based learning game can be configured to utilize biofeedback from a smart finger puppet integrated with smart sensors. For example, the wheel-based learning game can be configured to measure movements of a smart finger puppet, such as bend, stretch, flex, and display these parameters on a display. The wheel-based learning game can also display the measurement values of how much pressure the user applies on their finger or hands while performing fine motor activities. This quantitative data can be turn into a visual (diagram/game) biofeedback shown as values corresponding to the avatar finger puppet that will be associated with the user's actual health. FIG. 5A shows an example wheel-based learning game interface including a biometric feedback display. Real time health monitoring and game entertainment can be integrated by users, and even utilized for physical therapy, for example, for users with difficulty making precise movements with their hands and fingers. For example, if the game wheel lands on a sector of the wheel that has been assigned to a physical therapy or biometric play application, a 3D animation of the smart finger puppet can be displayed. Software such as software development kit (SUA), augmented reality software, mechanical translation software and programming language such as Lua (scripting language) can be utilized to allow the game application and the finger puppet to interact and communicate with each other. A user could utilize the smart finger puppet integrated with electronics to make and record an animation based on the movements of the finger puppet and store the recording in a sector of the wheel. Recording time can be set by the game application automatically. The recording can be defragmented by the game application, and then the components can be used to test the user's memory in the trivia mode portion of the game, as discussed in greater detail herein.

In certain embodiments, the wheel-based learning game can be configured to use a camera on a user device and/or motion capture hardware integrated into the smart finger puppet (or a smart glove). Utilizing these components, the wheel-based learning game can utilize technologies such as tactile haptic technology and/or holographic technology for users to virtually spin the game wheel with the motions of their hand, but without actually touching a game wheel (discussed in greater detail herein).

Figure 5B:
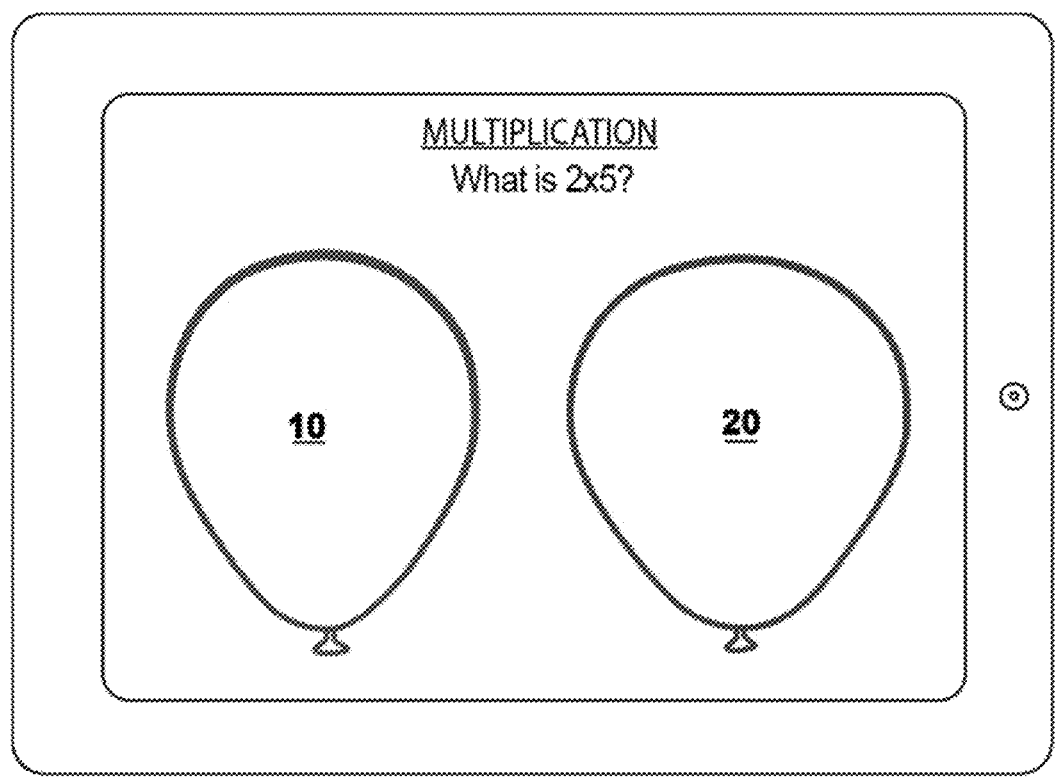
FIG. 5B illustrates an example game question interface, according to an embodiment of the present disclosure.

Once players have completed learning material in the learning mode, players may then move on to the "trivia mode." In the trivia mode, users may play a game and be tested on the information that they studied and learned in the learning mode. In one embodiment, the trivia game may be carried out by having each player spin the wheel. The wheel will land on a sector (associated with a particular topic/information), and a question or problem will be presented to the user based on the particular topic or information. The user must then select or provide the correct answer. FIG. 5B illustrates an example situation 500 in which the user is asked a question "What is 2×5?" and must select the correct answer. The user may do this by pressing the correct balloon on the user device touch screen. Each player takes turns spinning the wheel and answering questions. Points may be awarded for correct answers and subtracted for incorrect answers. Since each player is associated with a unique game wheel having different topics assigned to each sector, the wheel-based learning game may be configured to keep track of which player's turn it is so that the correct topics are assigned to the correct sectors. This will also allow the game to keep track of points for each correct answer by each player.

The wheel-based learning game may create questions and/or problems from the information provided in various ways. For example, the information provided may specify particular questions and answers, which may be tagged as questions and answers, such that the learning game can read the tags to present prepared questions and answers. Alternatively, the learning game may read in a variety of information and create questions or problems on its own. For example, the learning game may present one answer option that is pulled from the information provided, and present another option that is not from the information provided. In a more particular embodiment, the learning game may take snippets of the information to create true statements and false statements. By way of further example, consider the situation in which the topic is the Revolutionary War, and the user has provided one or more URLs containing information about the Revolutionary War. In this example, the learning game may receive, from the user-provided URL, the information that the Revolutionary War began in 1775. Seeing this statement, the learning game may create one option containing the statement "The Revolutionary War began in 1775" and create another statement "The Revolutionary War began in 1842." The user would have to know which statement is true and which is false to answer the problem correctly. In another example embodiment, the learning game may present a snippet of information from the provided URLs (e.g., a screenshot of a video, an image, a sentence of text) as one option, and a snippet of information not from the provided URLs (e.g., from a random URL, or from a database of false/random information), and the user will have to remember which snippet of information came from the topic URL(s) in order to select the correct answer. Players may be asked to provide "irrelevant" or "incorrect" URLs that do not relate to the topics selected for source material for incorrect options, or the learning game may have its own database of irrelevant and/or incorrect material that may be used. This database of irrelevant and/or incorrect material may be stored locally on the same computing machine as the learning game, or it may be stored in a remote server connected over a network.

The wheel-based learning game's trivia mode may itself have various game settings which slightly vary the way the trivia mode game is played. For example, in a first trivia mode setting, each player may identify the different topics to be assigned to their own game wheel. In this first mode, player 1 might select twelve topics for the twelve wheel sectors, defining a first game wheel, which player 1 would then use for the trivia game. Player 2 would select his or her own twelve topics for the twelve wheel sectors, defining a second game wheel, and player 2 would play the game based on his or her selected twelve topics in this second game wheel, and so forth.

In a second trivia mode setting, players may select topics for each other, such that each player is asked questions on topics selected by another player. For example, player 1 may select twelve topics to be assigned to the twelve wheel sectors, defining a first game wheel. However, rather than player 1 being asked questions based on the first game wheel, another player, player 2, may be asked questions based on the topics selected by player 1. And, thereby, player 1 would also be asked questions based on topics selected by another player (e.g., player 2 or player 3).

Finally, in a third trivia mode setting, each player may select twelve topics for the twelve sectors on the wheel, but topics may then be arranged randomly on each player's game wheel such that every player may be asked a question based on any topic selected by any player. In this mode, topics may be assigned to each player's wheel at the start of the game and remain static throughout the game, or topics may be randomly assigned to each player's wheel for each player's turn such that every turn may result in a different game wheel for each player. Alternatively, in this mode, topics may not be assigned to each sector in the wheel, and questions may be randomly asked to each player based on any of the topics selected without the need to spin the wheel.

In certain embodiments, the present invention can also utilize a holographic laser projection device that integrates infrared sensing technology to create an interactive projector that instantly can transform the game wheel's top surface into a touchscreen. Laser light sources can create bright, high-quality images without the need for special viewing screens. One embodiment of this invention can also be 3D holograms that float in space which can be touched with bare hands. The projected images can float in space away from the display surface and can be integrated with a tactile display such as an Airborne Ultrasound Tactile Display, which provides tactile sensation onto the user's hand.

Examples of haptic, holographic, and tactile technology can be found in the following U.S. patents and U.S. patent application publications, each of which is incorporated by reference as if fully set forth herein: U.S. Patent Application Publication No. 2015/0080060, entitled "Mobile Devices and Methods Employing Haptics," published Mar. 19, 2015 to Rodriguez et al.; U.S. Pat. No. 9,092,954, entitled "Wearable Haptic Device," issued Jul. 28, 2015 to Visitacion et al.; U.S. Pat. No. 8,890,667, entitled "Apparatus and Method for Providing Visual-Haptic Information, and Button Having the Same," issued Nov. 18, 2014 to Lim et al.; U.S. Pat. No. 9,148,897, entitled "Synchronizing Mobile Devices and Displays," issued Sep. 29, 2015 to Piqueras Jover; U.S. Pat. No. 9,013,451, entitled "Through Display Ultrasonic Touch-Screen Monitor," issued Apr. 21, 2015 to Schneider et al.; U.S. Patent Application Publication No. 2014/0232764, entitled "Image Display Apparatus and Control Method Thereof" published Aug. 21, 2014, to Nishio; U.S. Patent Application Publication No. 2013/0002405, entitled "Method and Apparatus for Sensory Tags Providing Sound, Smell and Haptic Feedback" published Jan. 3, 2013 to Pesonen et al.; U.S. Patent Application Publication No. 2011/0306425, entitled "Haptic Interface" published Dec. 15, 2011 to Rivard et al.; U.S. Pat. No. 9,069,031, entitled "Piezoeletrically Actuated Magnetic-Field Sensor" issued Jun. 30, 2015 to Guedes et al; U.S. Pat. No. 8,500,284, entitled "Broad Viewing Angle Displays and User Interfaces," issued Aug. 6, 2013 to Rotschild et al.; U.S. Patent Application Publication No. 2014/0146005, entitled "Display Apparatus for Sensing Touch and Providing an Electro-Tactile Feeling and a Method of Driving the Same" published May 29, 2014 to Hong et al; and U.S. Patent Application Publication No. 2015/0234485, entitled "Apparatus for Providing a Three Dimensional Tactile Display of an Electronic Device," published Aug. 20, 2015 to Ragan, Jr. et al.

Figure 6:
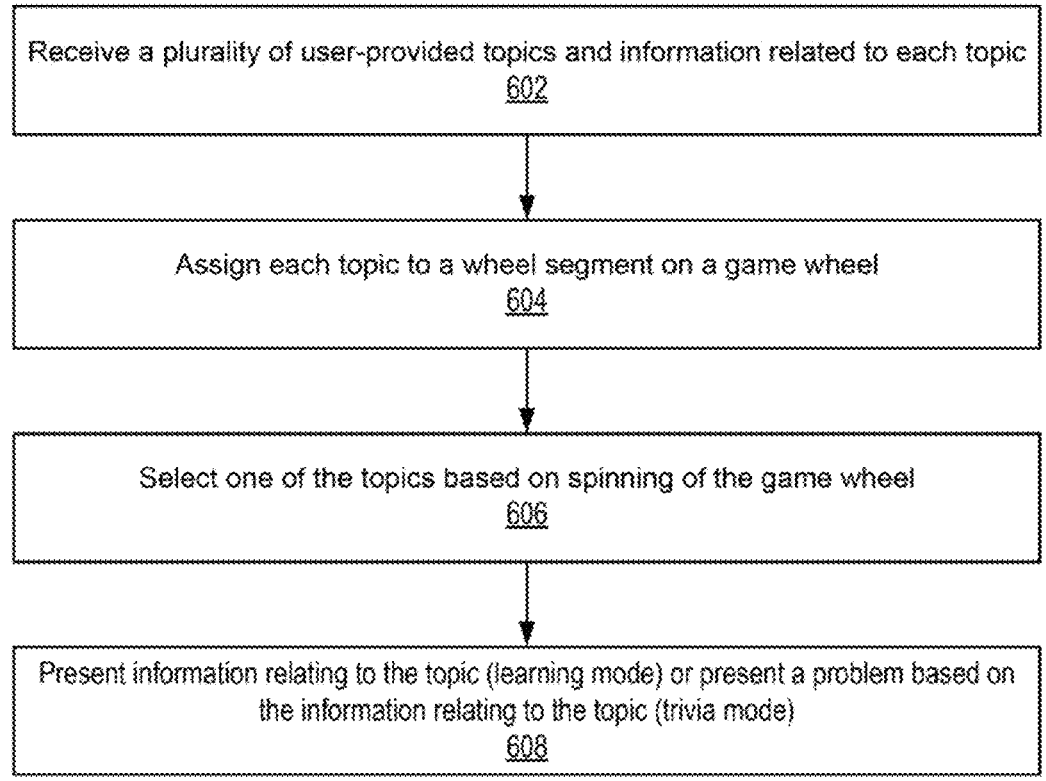
FIG. 6 illustrates an example method to execute a wheel-based learning game, according to an embodiment of the present disclosure.

FIG. 6 illustrates an example method 600 associated with executing a wheel-based learning game, according to an embodiment of the present disclosure. It should be appreciated that there can be additional, fewer, or alternative steps performed in similar or alternative orders, or in parallel, based on the various features and embodiments discussed herein unless otherwise stated At block 602, the example method 600 can receive a plurality of user-provided topics and information related to each topic. At block 604, the example method 600 can assign each topic to a wheel segment on a wheel. At block 606, the example method 600 can select one of the topics based on spinning of the game wheel. At block 608, the example method 608 can present information relating to the topic (in a learning mode), or present a problem based on the information relating to the topic (in a trivia mode).

Figure 7:
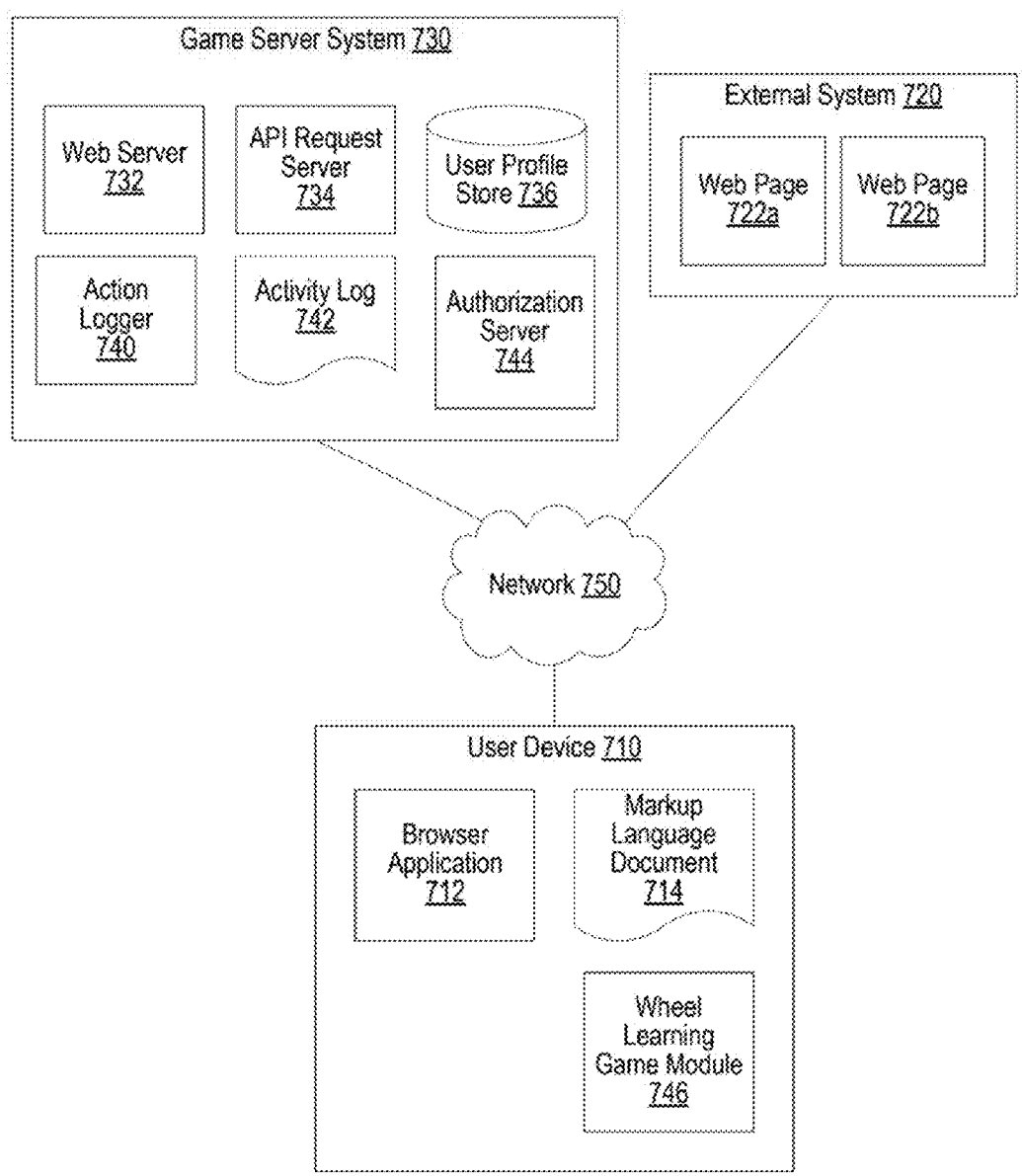
FIG. 7 illustrates a network diagram of an example system, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a game server system 730, and a network 750. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the game server system 730 is operated by a game provider, whereas the external systems 720 are separate from the game server system 730 in that they may be operated by different entities. In various embodiments, however, the game server system 730 and the external systems 720 operate in conjunction to provide gaming services to users (or members) of the game server system 730.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application or a gaming application that allows a user of the user device 710 to interact with the game server system 730. In another embodiment, the user device 710 interacts with the game server system 730 through an application programming interface (API) provided by the native operating system of the user device 710, such as iOS and ANDROID. The user device 710 is configured to communicate with the external system 720 and the game server system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the game server system 730 by processing a markup language document 714 received from the external system 720 and from the game server system 730 using a browser application 712 or a gaming application. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the game server system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

Alternatively, or in conjunction with the browser application 712 and the markup language document 714, the wheel learning game module 746 may be a stand-alone gaming application that does not require communication over the network 750 or any additional information from the game server system 730 other than what is available locally on the user device 710. In this embodiment, the modules and functions of the game server system 730 may actually be stored locally on the user device 710 and available locally to the wheel learning game module 746.

The external system 720 includes one or more web servers that include one or more web pages 722a, 722b, which are communicated to the user device 710 using the network 750. The external system 720 is separate from the game server system 730. For example, the external system 720 is associated with a first domain, while the game server system 730 is associated with a separate domain. Web pages 722a, 722b, included in the external system 720, comprise markup language documents 714 identifying content and including instructions specifying formatting or presentation of the identified content.

The game server system 730 includes a web server 732, an API request server 734, a user profile store 736, an action logger 740, an activity log 742, and an authorization server 744. In an embodiment of the invention, the game server system 730 may include additional, fewer, or different components for various applications. Other components are not shown so as to not obscure the details of the system.

The user profile store 736 maintains information about user accounts, including login information, learning information, performance information, previously entered URL information, and other types of descriptive information related to carrying out the technology disclosed herein. This information is stored in the user profile store 736 such that each user is uniquely identified.

The web server 732 links the game server system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the game server system 730 and one or more user devices 710. The messages can be instant messages, queued messages (e.g., email), text and SMS messages, or any other suitable messaging format.

The API request server 734 allows one or more external systems 720 and user devices 710 to call access information from the game server system 730 by calling one or more API functions. The API request server 734 may also allow external systems 720 to send information to the game server system 730 by calling APIs. The external system 720, in one embodiment, sends an API request to the game server system 730 via the network 750, and the API request server 734 receives the API request. The API request server 734 processes the request by calling an API associated with the API request to generate an appropriate response, which the API request server 734 communicates to the external system 720 via the network 750. In another embodiment, the user device 710 communicates with the game server system 730 via APIs in the same manner as external systems 720.

The action logger 740 is capable of receiving communications from the web server 732 about user actions on and/or off the game server system 730. The action logger 740 populates the activity log 742 with information about user actions, enabling the game server system 730 to discover various actions taken by its users within the game server system 730 and outside of the game server system 730. When a user takes an action within the game server system 730, the action is recorded in the activity log 742. In one embodiment, the game server system 730 maintains the activity log 742 as a database of entries. When an action is taken within the game server system 730, an entry for the action is added to the activity log 742. The activity log 742 may be referred to as an action log.

The authorization server 744 enforces one or more privacy settings of the users of the game server system 730, including storing and enforcing user login/password information.

Figure 8:
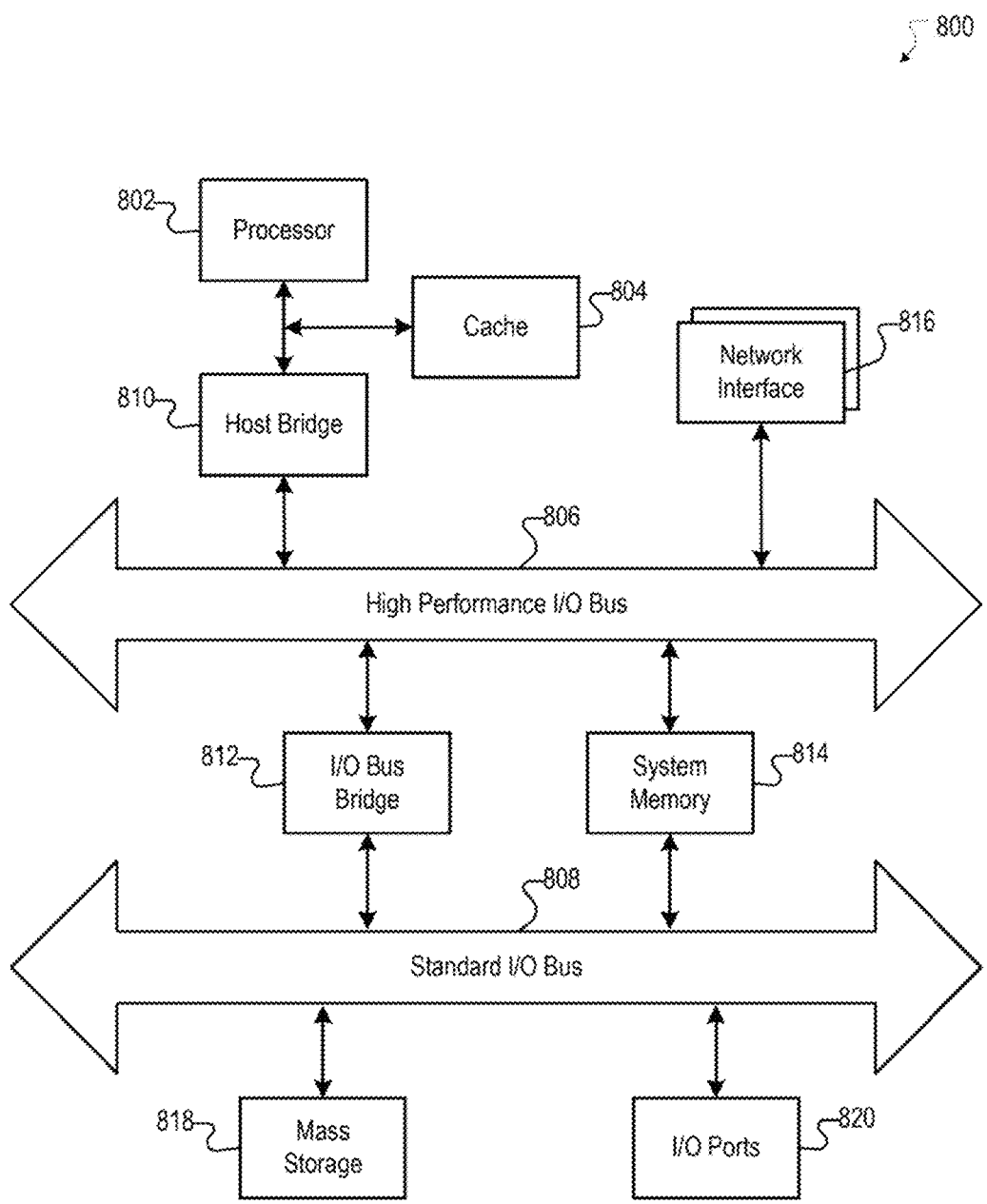
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the game server system 730, the user device 710, and the external system 820, or a component thereof. In an embodiment of the invention, the computer system 800 may be one server among many that constitutes all or part of the game server system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A computer-implemented method comprising:
receiving, on a computer system, a number of game wheel segments selection by a user via a graphical user interface of the computer system;
defining, by the computer system, a virtual game wheel comprising a plurality of wheel segments based on the number of game wheel segments selection received from the user, the virtual game wheel in communication with a physical game wheel to be spun by a user;
for each wheel segment of the plurality of wheel segments,
    receiving, on the computer system, one or more URLs entered by a user via the graphical user interface,
    downloading, by the computer system, information from each of the one or more URLs,
    creating, by the computer system, one or more problems based on the downloaded information from the one or more URLs, and
    associating, by the computer system, the one or more URLs, the downloaded information, and the one or more problems with the wheel segment;
associating a first player with a first character by reading a QR code on a first character card associated with the first character;
providing a first finger puppet that is associated with the first character;

receiving, by the computer system, a selected wheel segment of the plurality of wheel segments based on a spinning of the physical game wheel;

determining, by the computer system, that the game is in a learning mode;

in response to the determining that the game is in a learning mode, presenting at least a portion of the downloaded information associated with the selected wheel segment;

receiving, by the computer system, a second selected wheel segment of the plurality of wheel segments based on a spinning of the physical game wheel;

determining, by the computer system, that the game is in a trivia mode; and in response to the determining that the game is in a trivia mode, presenting a selected problem from the one or more problems associated with the second selected wheel segment.

2. The computer-implemented method of claim 1, wherein the presenting the problem from the one or more problems associated with the wheel segment further comprises presenting a first piece of information that was obtained from the one or more URLs; and presenting a second piece of information that was not obtained from the one or more URLs.

3. The computer-implemented method of claim 1, further comprising:

receiving a second number of game wheel segments selection by in user via the graphical user interface of the computer system;

defining a second virtual game wheel comprising a second plurality of wheel segments based on the second number of game wheel segments selection received from the user;

for each wheel segment of the second plurality of wheel segments, receiving a second set of URLs entered by a user via the graphical user interface, downloading a second set of information from the second set of URLs, creating a second set of problems based on the downloaded information from the second set of URLs, and associating, the second set of URLs, the downloaded information, and the second set of problems with the wheel segment.

4. The computer-implemented method of claim 3, wherein the virtual game wheel is associated with a first user, and the second virtual game wheel is associated with a second user.

5. The computer-implemented method of claim 1, wherein the receiving a selected Wheel segment of the plurality of wheel segments comprises randomly selecting, by the computer system, a first selected wheel segment of the plurality of wheel segments; and the method further comprises:

if the game is in a learning mode, randomly selecting a second wheel segment of the plurality of wheel segments, wherein the first selected wheel segment is excluded from the random selection.

6. The computer-implemented method of claim 1, wherein the creating one or more problems based on the downloaded information comprises:

creating true statements based on the downloaded information; and creating false statements.

7. The computer-implemented method of claim 1, wherein the method further comprises:

if the game is in the trivia mode, recording actions of a user performed in response to the presenting the selected problem.

8. The computer-implemented method of claim 7, wherein the recording the actions of the user is performed, at least in part, by a wearable device.

9. The computer-implemented method of claim 1, further comprising:

receiving, by the computing system, biometric information from a wearable device worn by the user.

10. A system comprising:

at least one processor;

a physical game wheel in communication with the at least one processor; and a memory storing instructions that, when executed by the at least one processor, cause the system to perform:

receiving a number of game wheel segments selection by a user via a graphical user interface of the computer system;

defining a virtual game wheel comprising a plurality of wheel segments based on the number of game wheel segments selection received from the user, the virtual game wheel associated with the physical game wheel;

for each wheel segment of the plurality of wheel segments, receiving one or more URLs entered by a user via the graphical user interface, downloading, by the computer system, information from each of the one or more URLs, creating one or more problems based on the downloaded information from the one or more URLs, and associating the one or more URLs, the downloaded information, and the one or more problems with the wheel segment;

associating a first player with a first character by reading a QR code on a first character card associated with the first character;

providing a first finger puppet that is associated with the first character;

receiving a selected wheel segment of the plurality of wheel segments based on a spinning of the physical game wheel;

determining that the game is in a learning mode;

in response to the determining that the game is in a learning mode, presenting at least a portion of the downloaded information associated with the selected wheel segment;

receiving, by the computer system, a second selected wheel segment of the plurality of wheel segments based on a spinning of the physical game wheel;

determining that the game is in a trivia mode; and in response to the determining that the game is in a trivia mode, presenting a selected problem from the one or more problems associated with the second selected wheel segment.

11. The system of claim 10, wherein the presenting the selected problem from the one or more problems associated with the second selected wheel segment further comprises presenting a first piece of information that was obtained from the one or more URLs; and presenting a second piece of information that was not obtained from the one or more URLs.

12. A non-transitory computer-readable storage medium including instructions that, when executed by at least one processor of a computing system, cause the computing system to perform:
- receiving a number of game wheel segments selection by a user via a graphical user interface of the computer system;
- defining a virtual game wheel comprising a plurality of wheel segments based on the number of game wheel segments selection received from the user, the virtual game wheel associated with a physical game wheel;
- for each wheel segment of the plurality of wheel segments,
  - receiving one or more URLs entered by a user via the graphical user interface,
  - downloading, by the computer system, information from each of the one or more URLs,
  - creating one or more problems based on the downloaded information from the one or more URLs, and
  - associating the one or more URLs, the downloaded information, and the one or more problems with the wheel segment;
- associating a first player with a first character by reading a QR code on a first character card associated with the first character;
- providing a first finger puppet that is associated with the first character;
- receiving a selected wheel segment of the plurality of wheel segments based on a spinning of the physical game wheel;
- determining that the game is in a learning mode;
- in response to the determining that the game is in a learning mode, presenting at least a portion of the downloaded information associated with the selected wheel segment;
- receiving, by the computer system, a second selected wheel segment of the plurality of wheel segments based on a spinning of the physical game wheel;
- determining that the game is in a trivia mode; and
- in response to the determining that the game is in a trivia mode, presenting a selected problem from the one or more problems associated with the second selected wheel segment.

13. The non-transitory computer-readable storage medium of claim 12, wherein the presenting the selected problem from the one or more problems associated with the second selected wheel segment further comprises
- presenting a first piece of information that was obtained from the one or more URLs; and
- presenting a second piece of information that was not obtained from the one or more URLs.

14. The non-transitory computer-readable storage medium of claim 12, wherein the instructions further cause the computing system to perform:
- if the game is in the trivia mode, recording actions of a user performed in response to the presenting the selected problem.

15. The non-transitory computer-readable storage medium of claim 12, wherein the recording the actions of the user is performed, at least in part, by is wearable device.

16. The non-transitory computer-readable storage medium of claim 12, wherein the instructions further cause the computing system to perform;
- receiving biometric information from a wearable device worn by the user.

\* \* \* \* \*